United States Patent
Klinefelter et al.

(10) Patent No.: US 6,832,866 B2
(45) Date of Patent: Dec. 21, 2004

(54) PRINTER OR LAMINATOR SUPPLY

(75) Inventors: Gary M. Klinefelter, Eden Prairie, MN (US); Matthew K. Dunham, Eagan, MN (US); Jeffrey D. Upin, Edina, MN (US); Gary A. Lenz, Eden Prairie, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 0 days.

(21) Appl. No.: 10/722,377

(22) Filed: Nov. 25, 2003

(65) Prior Publication Data

US 2004/0136768 A1 Jul. 15, 2004

Related U.S. Application Data

(63) Continuation of application No. 10/071,554, filed on Feb. 8, 2002, now Pat. No. 6,694,884, which is a continuation-in-part of application No. 09/489,591, filed on Jan. 21, 2000, now Pat. No. 6,386,772.
(60) Provisional application No. 60/117,123, filed on Jan. 25, 1999.

(51) Int. Cl.[7] .............................. B41J 25/38; B41J 29/54
(52) U.S. Cl. ..................... 400/668; 400/208; 400/692; 346/825.3; 346/825.54; 347/177; 235/380; 235/472.02; 101/483; 705/22; 705/28; 700/79
(58) Field of Search .................. 101/483; 400/668, 400/207, 208, 208.1, 692; 346/825.3, 825.54; 347/177; 235/280, 472.02; 705/22, 28; 700/79

(56) References Cited

U.S. PATENT DOCUMENTS

| | | | |
|---|---|---|---|
| 3,598,396 A | 8/1971 | Andrews et al. | 271/9 |
| 3,755,653 A | 8/1973 | Venker | 235/61.11 |
| 3,889,472 A | 6/1975 | Guillaud | 60/698 |
| 3,960,072 A | 6/1976 | Ahlgren et al. | 101/35 |
| 4,015,839 A | 4/1977 | McKee | 271/37 |
| 4,017,068 A | 4/1977 | McKee | 271/275 |
| 4,031,518 A * | 6/1977 | Holloran et al. | 340/172.5 |
| 4,031,578 A | 6/1977 | Sweeney et al. | 340/172.5 |
| 4,068,028 A | 1/1978 | Samonides | 428/40 |
| 4,102,267 A | 7/1978 | Ritzerfeld | 101/132.5 |
| 4,146,900 A | 3/1979 | Arnold | 346/75 |
| 4,161,312 A | 7/1979 | Eckhardt et al. | 271/3 |
| 4,393,386 A | 7/1983 | Di Giulio | 346/75 |
| 4,534,313 A | 8/1985 | Louvel | 118/696 |

(List continued on next page.)

FOREIGN PATENT DOCUMENTS

| | | |
|---|---|---|
| DE | 25 35 699 A1 | 3/1977 |
| EP | 0 562 979 A2 | 9/1993 |
| EP | 0 562 979 | 9/1993 |

(List continued on next page.)

OTHER PUBLICATIONS

U.S. patent application Ser. No. 09/189959 filed Nov. 10, 1998, Holic Now Abandoned.*

(List continued on next page.)

*Primary Examiner*—Eugene H. Eickholt
(74) *Attorney, Agent, or Firm*—Westman, Champlin & Kelly

(57) ABSTRACT

An identification card printer or laminator system includes a card transport mechanism configured to transport a card along a path, a printer or lamination mechanism configured to print or laminate the card, a print or lamination consumable supply, and a controller. The printer or lamination consumable supply includes a tag circuit that contains supply data including a tag security code. The controller is configured for communication with the tag circuit and is further configured to allow operation of the printer or laminator system with the consumable supply when the tag security code is valid, and to prevent operation of the printer or laminator system with the consumable supply when the tag security code is invalid.

38 Claims, 8 Drawing Sheets

U.S. PATENT DOCUMENTS

| | | | |
|---|---|---|---|
| 4,604,631 A | | 8/1986 | Jinnai et al. .................. 346/1.1 |
| 4,680,596 A | | 7/1987 | Logan ......................... 346/140 |
| 4,685,702 A | | 8/1987 | Kazuharu ..................... 283/81 |
| 4,686,540 A | | 8/1987 | Leslie et al. ................... 346/33 |
| 4,716,346 A | | 12/1987 | Matsuo ......................... 318/38 |
| 4,734,868 A | | 3/1988 | DeLacy ....................... 364/519 |
| 4,781,985 A | | 11/1988 | Desjarlais ................... 428/421 |
| 4,782,363 A | | 11/1988 | Britt et al. ...................... 355/14 |
| 4,797,018 A | * | 1/1989 | Hofmann et al. ........... 400/208 |
| 4,845,490 A | * | 7/1989 | Ward et al. ............ 340/825.31 |
| 4,961,088 A | | 10/1990 | Gilliland et al. ............. 355/206 |
| 4,970,544 A | * | 11/1990 | Furusawa et al. ............. 355/24 |
| 5,019,839 A | | 5/1991 | Watanabe et al. ........... 346/134 |
| 5,027,288 A | * | 6/1991 | Suzuki et al. .............. 358/1.18 |
| 5,077,467 A | | 12/1991 | Barron, Jr. et al. ......... 250/221 |
| 5,111,239 A | | 5/1992 | Kamimura et al. ........... 355/45 |
| 5,138,344 A | * | 8/1992 | Ujita .......................... 400/175 |
| 5,149,211 A | * | 9/1992 | Pettigrew et al. ............. 400/88 |
| 5,184,181 A | | 2/1993 | Kurando et al. ............. 355/260 |
| 5,239,926 A | | 8/1993 | Nubson et al. ............. 101/487 |
| 5,266,781 A | * | 11/1993 | Warwick et al. ............ 235/380 |
| 5,266,968 A | * | 11/1993 | Stephenson ................. 400/208 |
| 5,267,800 A | * | 12/1993 | Petteruti et al. .............. 400/89 |
| 5,277,501 A | | 1/1994 | Tanaka et al. ................ 400/120 |
| 5,318,370 A | * | 6/1994 | Nehowig ..................... 400/207 |
| 5,327,201 A | | 7/1994 | Coleman et al. ............ 355/278 |
| 5,368,677 A | | 11/1994 | Ueda et al. .................. 156/362 |
| 5,455,617 A | | 10/1995 | Stephenson et al. ......... 400/207 |
| 5,466,319 A | | 11/1995 | Zager et al. ................. 156/220 |
| 5,502,464 A | | 3/1996 | Takahashi et al. ............ 346/25 |
| 5,516,218 A | | 5/1996 | Amano et al. .............. 400/535 |
| 5,530,468 A | | 6/1996 | Yoshimi et al. ............. 347/262 |
| 5,642,877 A | | 7/1997 | Green ......................... 271/35 |
| 5,646,388 A | | 7/1997 | D'Entremont et al. ...... 235/380 |
| 5,695,589 A | | 12/1997 | German et al. ............. 156/250 |
| 5,703,347 A | | 12/1997 | Reddersen et al. ......... 235/472 |
| 5,707,162 A | * | 1/1998 | Kasai et al. ................. 400/692 |
| 5,709,484 A | | 1/1998 | Dorner ....................... 400/188 |
| 5,755,519 A | | 5/1998 | Klinefelter .................. 400/249 |
| 5,772,199 A | | 6/1998 | Green ..................... 271/10.06 |
| 5,814,796 A | * | 9/1998 | Benson et al. .............. 235/380 |
| 5,820,281 A | | 10/1998 | Hill et al. .................... 400/621 |
| 5,837,991 A | | 11/1998 | LaManna et al. ........... 235/475 |
| 5,882,127 A | | 3/1999 | Amano ....................... 400/621 |
| 5,889,866 A | * | 3/1999 | Cyras et al. ................... 380/49 |
| 5,936,008 A | | 8/1999 | Jones et al. .................. 523/161 |
| 5,974,085 A | * | 10/1999 | Smith .......................... 375/220 |
| 5,978,621 A | | 11/1999 | Glemser et al. ............... 399/90 |
| 5,980,011 A | | 11/1999 | Cummins et al. .............. 347/4 |
| 5,995,774 A | | 11/1999 | Applegate et al. ............ 399/27 |
| 6,011,741 A | * | 1/2000 | Wallace et al. ............. 365/221 |
| 6,037,879 A | * | 3/2000 | Tuttle .................... 340/825.54 |
| 6,039,430 A | * | 3/2000 | Helterline et al. ............ 347/19 |
| 6,071,024 A | * | 6/2000 | Chi-Ming et al. .......... 347/177 |
| 6,072,402 A | * | 6/2000 | Kniffin et al. ......... 340/825.31 |
| 6,076,913 A | | 6/2000 | Garcia et al. ................. 347/19 |
| 6,099,101 A | | 8/2000 | Maurelli et al. ............... 347/7 |
| 6,099,178 A | * | 8/2000 | Spurr et al. .................. 400/207 |
| 6,113,208 A | | 9/2000 | Benjamin et al. .............. 347/7 |
| 6,163,658 A | | 12/2000 | Suzuki ........................ 399/12 |
| 6,179,401 B1 | | 1/2001 | Stephens, Jr. et al. ........ 347/19 |
| 6,213,392 B1 | * | 4/2001 | Zuppicich .................. 235/380 |
| 6,220,511 B1 | * | 4/2001 | Holec et al. ................. 235/380 |
| 6,252,791 B1 | * | 6/2001 | Wallace et al. ............. 365/222 |
| 6,253,329 B1 | | 6/2001 | Kang ......................... 713/300 |
| 6,263,170 B1 | | 7/2001 | Bortnem ..................... 399/13 |
| 6,264,296 B1 | | 7/2001 | Klinefelter et al. ............ 347/4 |
| 6,264,301 B1 | | 7/2001 | Helterline et al. ............ 347/19 |
| 6,267,463 B1 | | 7/2001 | Paulsen et al. ............... 347/19 |
| 6,271,928 B1 | | 8/2001 | Bullock et al. ............. 358/1.16 |
| 6,298,336 B1 | * | 10/2001 | Davis et al. ................. 705/41 |
| 6,302,527 B1 | | 10/2001 | Walker ....................... 347/50 |
| 6,305,795 B2 | | 10/2001 | Childers et al. ............. 347/86 |
| 6,312,083 B1 | | 11/2001 | Moore ......................... 347/19 |
| 6,312,106 B1 | | 11/2001 | Walker ....................... 347/50 |
| 6,325,495 B1 | | 12/2001 | Foth ............................ 347/84 |
| 6,341,839 B1 | | 1/2002 | Burikov et al. ............... 347/37 |
| 6,371,586 B1 | | 4/2002 | Saruta ........................... 347/7 |
| 6,386,772 B1 | * | 5/2002 | Klinefelter et al. ......... 400/208 |
| 6,405,055 B1 | | 6/2002 | Silverbrook et al. ........ 455/556 |
| 6,409,086 B1 | * | 6/2002 | Pellaumall et al. ..... 235/462.13 |
| 6,464,317 B2 | | 10/2002 | Miyazawa ................... 347/14 |
| 6,512,594 B1 | * | 1/2003 | Lenz et al. ................. 358/1.16 |
| 6,644,771 B1 | | 11/2003 | Silverbrook .................. 347/19 |
| 6,688,519 B2 | * | 2/2004 | Vuong et al. ............... 235/436 |
| 2002/0005116 A1 | * | 1/2002 | Francis et al. ............. 358/1.14 |
| 2002/0051167 A1 | | 5/2002 | Francis et al. ............. 385/1.14 |
| 2003/0059050 A1 | | 3/2003 | Hohberger et al. ......... 380/270 |
| 2004/0022572 A1 | | 2/2004 | Bungert et al. ............. 400/248 |

FOREIGN PATENT DOCUMENTS

| | | |
|---|---|---|
| EP | 0 887 197 | 12/1998 |
| EP | 0 887 197 A2 | 12/1998 |
| EP | 0 979 736 | 2/2000 |
| EP | 0 979 736 A1 | 2/2000 |
| GB | 2 120 821 A | 12/1983 |
| JP | 411105359 A | 4/1999 |
| JP | 11 265463 | 9/1999 |
| WO | WO 95/09084 | 4/1995 |
| WO | WO 99/04368 | 1/1999 |
| WO | WO 99/21713 | 5/1999 |
| WO | 99/49379 | 9/1999 |
| WO | WO 99/49379 | 9/1999 |
| WO | WO 00/43932 | 7/2000 |
| WO | WO 2003/019459 A3 | 3/2003 |
| WO | WO 2004/011268 A1 | 2/2004 |

OTHER PUBLICATIONS

"Standard Read/Write Identification IC", by TEMIC Semiconductor GmbH, Heilbronn Germany, (Apr. 1999).

"Introduction the New SmartGuard™ and SmartShield™ Advanced Security Options", pamphlet by Fargo Electronics, Inc., Eden Prairie, Minnesota (1998).

"RFID Tagging IC is First to Accept Input from Sensors", by Microchip Technology Inc., (undated).

Streamfeeder—ST 1250 Universal Friction Feeder; last modified Feb. 27, 2000; 1 page with heading of "Streamfeeder—Product Index"; and 3 pages with heading of "Streamfeeder—ST 1250 Universal Friction Feeder".

Two page web site advertisement from SEIKO Precision, entitled "The lastest design for your CD–R", re: CD Printer 2000.

Two page web site advertisement from SEIKO Precision, entitled "CD Printer 2000".

Two page web site advertisement from SEIKO Precision, entitled "CD Printer 4000".

Partial International Search for International Application No. PCT/US 01/17146, filed May 25, 2001 (with Invitation to Pay Fees).

International Search Report for International Application No. PCT/US 00/01697, filing date Jan. 27, 2000, dated Oct. 18, 2000.

International Search Report from International Application No. PCT/US 03/06187, filed Feb. 28, 2003. Search report dated Jul. 18, 2003.

Office Communication for Application No. 09/489,591, filed Jan. 21, 2000. Date mailed Apr. 16, 2001.

Office Communication for Application No. 09/489,591, filed Jan. 21, 2000. Date mailed Oct. 2, 2001.

Office Communication for Application No. 10/071,554, filed Feb. 8, 2002. Date mailed May 20, 2003.

* cited by examiner

RFID TAG MEMORY MAP

| BIT | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| BLOCK 0 | MODE DATA (NOT NORMALLY TRANSMITTED) |||||||||||||||||||||||||||||||
| BLOCK 1 | NUMBER OF IMAGES (UP TO 4,096) |||||||||||||||| MATERIAL (16) |||| SUPPLIER (16) |||| PANEL SIZE (16) |||| THICKNESS (16) |||| NOT USED ||||
| BLOCK 2 | LOT CODE (4096) |||||||||||||||| MONTH EXP DATE |||| YEAR EXP DATE (2256) |||| NOT USED ||||||||
| BLOCK 3 | ROLL ID (UP TO 655536) |||||||||||||||| NOT USED ||||||||||||||||
| BLOCK 4 | INTERLOCK ||||||||||||||||||||||||||||||||
| BLOCK 5 | CUSTOMIZABLE LOCKING FEATURE ||||||||||||||||||||||||||||||||
| BLOCK 6 | ERROR CODE (256) |||||||| CUSTOMER NAME (ID NUMBER 4096) |||||||||||||||| OPERATOR ID (16) |||| NOT USED ||||
| BLOCK 7 | USER DATA OR PASSWORD ||||||||||||||||||||||||||||||||

FIG. 9

PRINTER OR LAMINATOR SUPPLY

The present application is a continuation of U.S. patent application Ser. No. 10/071,554, filed Feb. 8, 2002, entitled "METHOD AND APPARATUS FOR COMMUNICATING BETWEEN PRINTER AND CARD SUPPLY", and issued Feb. 24, 2004 as U.S. Pat. No. 6,694,884, which is a continuation-in-part of U.S. application Ser. No. 09/489,591, filed Jan. 21, 2000 entitled "METHOD AND APPARATUS FOR COMMUNICATING BETWEEN PRINTER OR LAMINATOR AND SUPPLIES", and issued as U.S. Pat. No. 6,386,772 on May 14, 2002, which in turn claims the benefit of U.S. Provisional Application Ser. No. 60/117,123, filed Jan. 25, 1999.

BACKGROUND OF THE INVENTION

The present invention relates to electronic printers and laminators of the type used to print or laminate a substrate. More specifically, the present invention relates to the transfer of data between the electronic printer or laminator and supplies which are used during operation of the printer.

Electronic printers are used for printing onto the substrate. Examples of such printers include bubble jet, dye sublimation, impact, and laser printers. In general, all such printers require some type of supply for their continued operation. Examples of such supplies include ribbon, ink, toner cartridge, print medium, overlaminate film, cleaning tape, cleaning roller, etc.

U.S. Pat. No. 5,755,519, issued May 26, 1998 and entitled "PRINTER RIBBON IDENTIFICATION SENSOR" describes an identification system for a hub which carries a ribbon. This allows the printer to receive information from the ribbon core such as the type of ribbon or the particular section or panel of ribbon being printed. The information is encoded magnetically or through bar coding. However, the information carried on the ribbon is fixed and can not be changed during use.

SUMMARY OF THE INVENTION

The present invention is generally directed to an identification card printer or laminator system that is configured for communication with a supply. This system includes a card transport mechanism configured to transport a card along a path, a print or lamination mechanism configured to print or laminate the card, a print or lamination consumable supply, and a controller. The printer or lamination consumable supply includes a tag circuit that contains supply data including a tag security code. The controller is configured for communication with the tag circuit and is further configured to allow operation of the printer or laminator system with the consumable supply when the tag security code is valid, and to prevent operation of the printer or laminator system with the consumable supply when the tag security code is invalid.

Another aspect of the present invention is directed to a method of controlling an identification card printer or laminator system. In the method, a print or lamination consumable supply is provided that includes a tag circuit containing supply data including a tag security code. Next, the tag security code is read and compared to a corresponding second security code to determine whether the tag security code is valid or invalid. Finally, operation of the printer or laminator system is disabled when the tag security code is invalid.

BRIEF DESCRIPTION OF THE DRAWINGS

FIG. 9 is an example memory map for use with the present invention.

DETAILED DESCRIPTION OF THE ILLUSTRATIVE EMBODIMENTS

Figure 1:
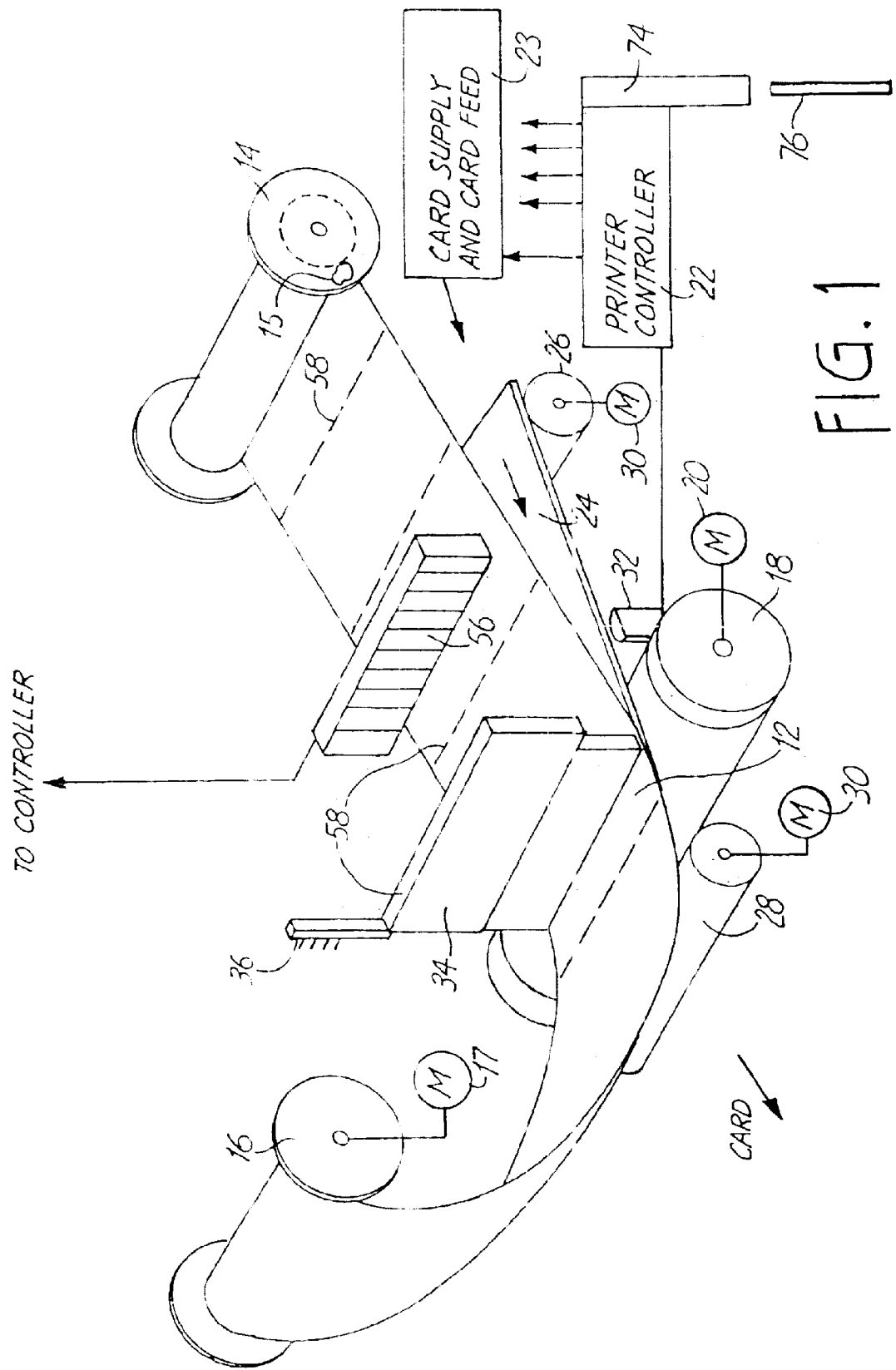
FIG. 1 is a schematic representation of a thermal printer head and ribbon shown in use with a ribbon index code and code sensor and schematically showing an alterable core.

In FIG. 1, a schematic representation shows a printer ribbon 12 provided from a supply roll or core 14 that would include the alterable, embedded identification tag or circuit (ID tag) shown generally at 15. The ribbon 12, for purposes of illustration, extends to an optional take up roll 16, the core of which also could have an ID tag if desired. The ribbon 12 passes over a printing platen 18 that is rotatably driven by a motor 20, under central control from a printer controller 22. The take up roll 16 can be driven by a motor 17 if desired and that can be synchronized with a drive of the roller 14 by the printer controller 22. A card or substrate 24 to be printed on is driven forward and backward on suitable rollers 26 with driver motors 30 that synchronize it with the movement of the individual color panels or frames that repeat in a sequence or group on the ribbon 12.

A conventional thermal print head 34 can be supported on a printer frame 36, relative to platen 18. The printing operation is synchronized through controller 22 using a card sensor 32 so that the card 24 would be printed appropriately. The card 24 will come from a card supply and card feeder 23 in a conventional manner using the powered rollers 26 driven by stepper motors 30 as controlled by the printer. controller 22. The controller 22 also controls motor 20 for platen 18.

Figure 2:
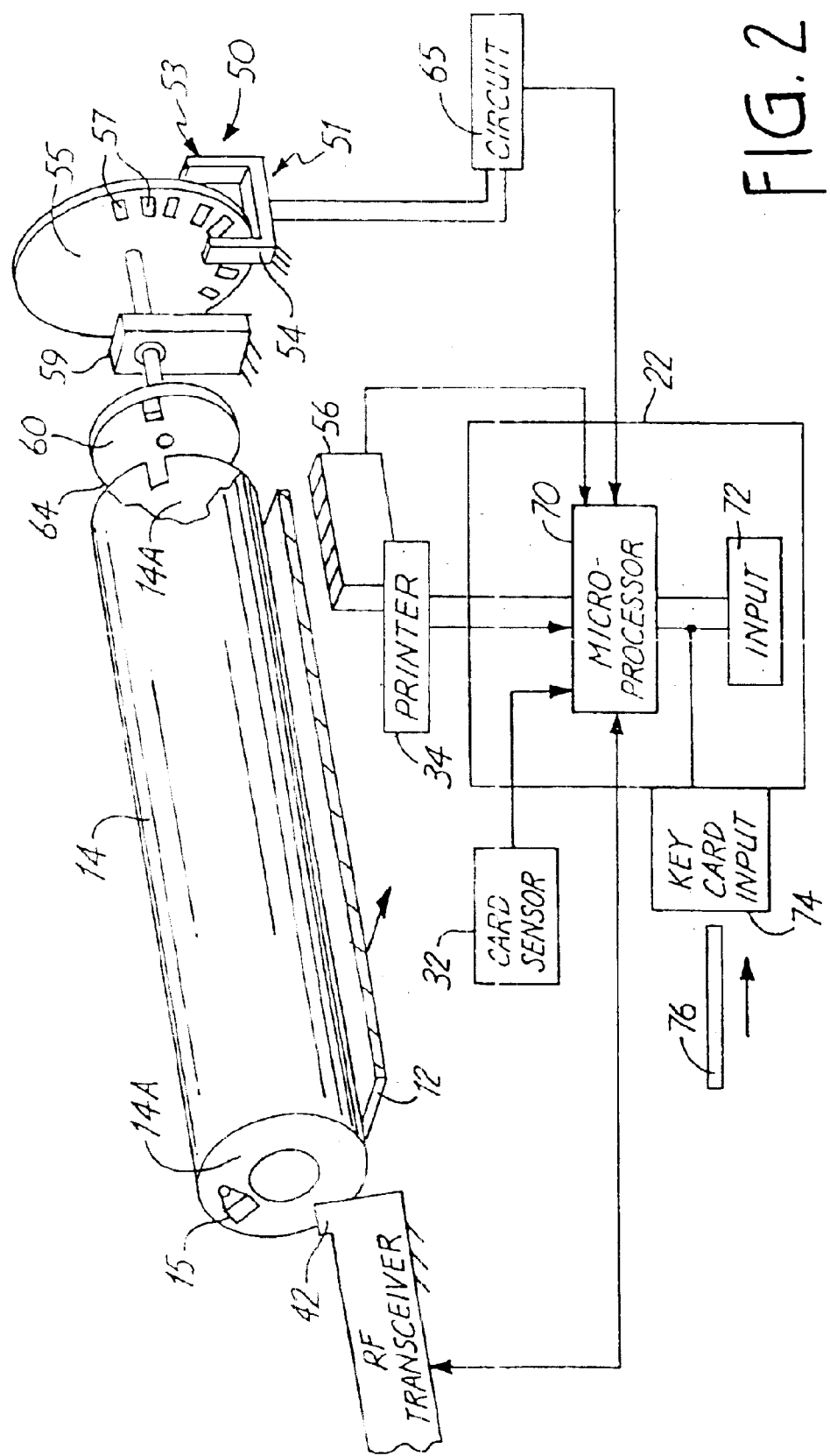
FIG. 2 is a schematic representation of a printer ribbon core and control system using Radio Frequency circuit in a core schematically shown.

In FIG. 2, a schematic arrangement of a ribbon core, ID tag, transmitter/receiver (sensor) and the controls is shown. The supply roll 14 is illustrated schematically, and it shows the ribbon or web 12 coming off the supply roll.

A Radio Frequency transmitter/receiver circuit head or antenna (or read/write circuit, head or antenna) 42 is positioned adjacent to one end of the ribbon supply roll 14, and the Radio Frequency ID Tag 15 is illustrated schematically as being embedded in the core 14A of the ribbon supply roll. The antenna 42 is positioned closely adjacent to the core 14A of the ribbon supply roll 14, so that it can transmit to and receive from ID tag 15 low power Radio Frequency (RF) signals. However, with more powerful signals or more sensitive electronics, the spacing can be any suitable distance.

At the opposite end of the ribbon supply roll 14, an encoder system for encoding supply roll rotational information is illustrated at 50. This type of encoder for roll position can be used for cooperating with the ID tag information to provide records or information as to ribbon usage and the like back to the ID tag so that when the ribbon supply roll is removed from a printer, and subsequently placed in another printer, information such as the number of prints remaining, and the number of prints used can be provided, as well as ensuring that the position of the roll is proper when installed. The encoder 50 is well known and includes an encoder wheel 55 that has a plurality of apertures 57 that will transmit light. The apertures 57 are separated by opaque or light blocking segments. The wheel 55 is supported for rotation with the ribbon supply roll 14. A suitable bearing arrangement as shown at 59 can be used if desired. Wheel 55 is mounted on a shaft that has a drive coupler 60 thereon, which is provided with a suitable key that is received by an end slot 64 in the core 14A. The wheel 55 is driven by the ribbon supply roll 14 when the drive parts are engaged.

An optical sensor illustrated schematically at 51 has a light source 53 and a receiver 54. The receiver 54 as shown is a light sensitive diode, so that each time an opening 57 moves between the light source and the receiver there is a pulse that indicates the rotational position of the ribbon supply roll 14. The number of pulses received by circuitry 65 indicates the amount of rotation, and the circuit keeps a count of the number of pulses. These count signals are provided to a microprocessor 70 that forms part of the printer controller 22. Of course, more complex techniques can be used, for example, if the ribbon undergoes bidirectional movement.

The printer controller 22 can include an input circuit shown at 72 that can provide both manual inputs for printer control of the printer head 34, and signal inputs from the ID tag, or a key card input directly to the microprocessor.

One of the features of the present invention is that the printer controller 22 can have a key card input circuitry 74 in which a programmed key card or "smart" card key 76 can be inserted to ensure that the printer, and thus the printer ribbon, will not be operated unless the correct key card has been inserted and the correct algorithm interpreted for unlocking or enabling the printer controller 22. The use of a smartcard is set forth in U.S. application Ser. No. 09/263,343, filed Mar. 5, 1999 and entitled "SECURITY PRINTING AND UNLOCKING MECHANISM FOR HIGH SECURITY PRINTERS" which incorporated herein by reference. Key card inputs are known in the field, and can comprise a number of different signals that can be used in an algorithm to ensure that the printer controller would be unlocked or enabled only when the appropriate card is inserted. The card also can include information that can be correlated to a checking of the signals from the ID tag or controller and from the key card by the Radio Frequency transmitter/receiver 42 to insure that the appropriate ribbon has been inserted into the printer before the printer controller is unlocked for use. This can be used to lock the printer and ribbon or laminate so that only the proper laminate, in the proper order can be used in a high security implementation. This can also be used to match a person with a password to a ribbon.

Additionally, the ribbon information that is coded onto the ribbon by the bar codes or similar indicia 58 and read from the infrared sensors 56 can be fed directly to the microprocessor 70 of the printer controller so that a wide range of information is available to the microprocessor 70 before enabling the printer. One such technique is described in U.S. patent application Ser. No. 09/309,391, filed May 10, 1999 and entitled "ID CODE FOR COLOR THERMAL PRINT RIBBON which is incorporated herein by reference. The microprocessor can thus provide various information back to the Radio Frequency transmitter/receiver or read/write antenna 42. Additionally, the microprocessor can verify the ribbon against the various settings of the printer and prevent operator error.

Figure 3:
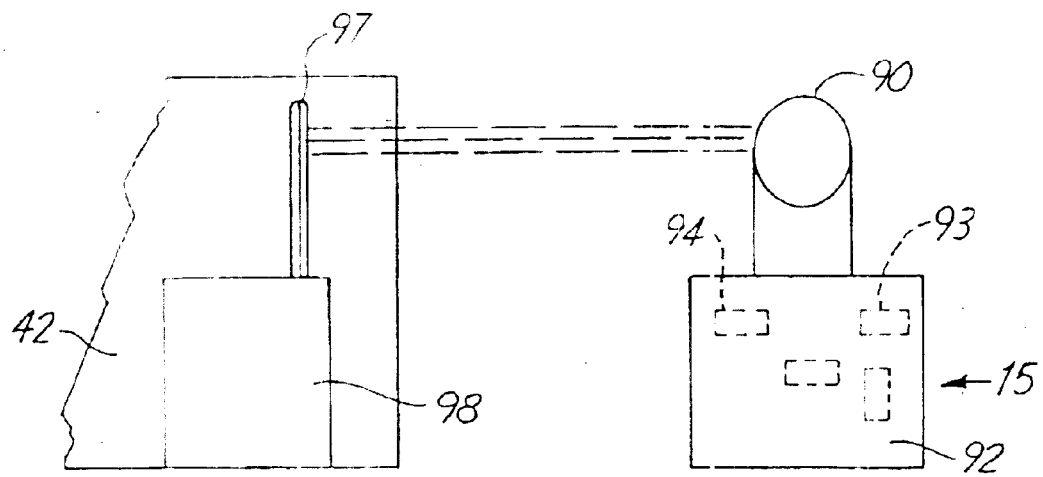
FIG. 3 is a schematic representation of a Radio Frequency transmitter/receiver and ID tag for ribbon identification.
Figure 4:
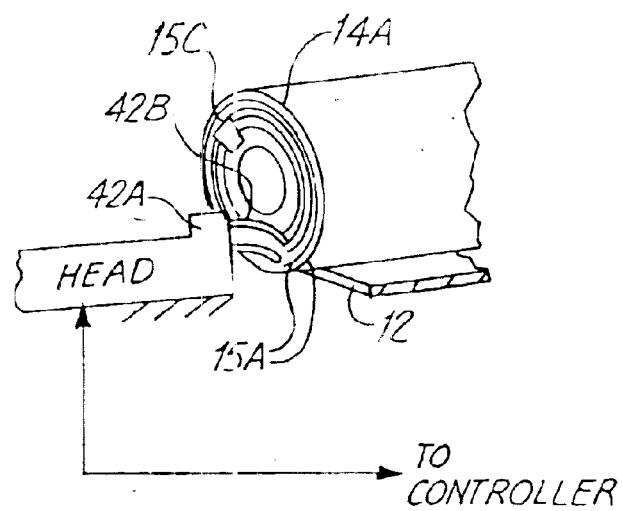
FIG. 4 is a fragmentary schematic perspective view of an alternate embodiment of the invention.

FIG. 3 is a schematic representation of a typical RF embedded circuit ID tag 15, which includes a small wire loop antenna 90, and a chip 92 on which circuit components are provided. The chip 92 can include memory such as that shown at 93, and a transmitter/receiver circuit 94 of very low power capacity. The memory can act as a counter and be decremented for each print made, for example so the prints remaining are known, and a binary code unique to the ribbon can be stored. FIG. 3 shows the read/write circuit antenna 42 positioned adjacent to the ID tag 15. The antenna 42 has an antenna portion 97 that can transmit and receive RF signals to and from the antenna 90 on the circuit for the ID tag 15. The antenna or read/write head 42 includes circuitry 98 that provides signals to and from the microprocessor 70. The transmitter/ receiver or read/write antenna 42 can provide signals that will energize digital components on the ID tag for transmission of data from the counters or memory 93 back to the circuit 98 on the antenna 42, which indicates the status of the ribbon on core 14A, and some identification parameters, such as the serial number, lot code, date code, password or errors. The information can indicate the type of ribbon on the roll, or include a code which permits operating with only a specific printer or group of printers and similar information.

It should be noted that the transmitter/receiver 42 can be a fixed installation, as stated, that would transmit through the packaging used for the ribbon, when received from a supplier, so that the ID tag 15, when using RF transmissions, could be preprogrammed with identification as to type of ribbon and the like, subsequent to packaging without breaking the package open, either by the printer manufacturer or by a distributor. The type of ribbon can be coded in, including information about the density of the dye in individual panels and when the ribbon is placed into a printer. This information can be read out by the transmitter/receiver 42 and provided to the printer controller microprocessor 70 to adjust the print head for the heat level needed for different densities of panels of ribbon to improve image quality. When ribbon information is correlated with the encoder circuitry 50 information through the microprocessor 70, the information about the number of prints that remain can be written to the ID tag 15 at the end of the printing cycle if the ribbon is to be removed from the printer, so that the next time that the ribbon is placed into a printer the exact number of prints that are left is known. The spool or roll size changes as the ribbon is used and the torque and tensioning of the ribbon roll drive motors can be changed to adjust for decreasing ribbon spool size and weight to improve image quality.

Further, the printer 34 and the controller 22 can provide date code information that can be encoded into the ID tag 15, using antenna 42 so that it will be known if the ribbon shelf life has expired. The ID tag 15 can be programmed by antenna 42 with password information so that particular key card 76 could have to have a password that must match with a password on the ID tag 15 for the ribbon before the printer would be enabled. Thus a particular key card would have to be inserted before the printer would work with a particular ribbon. This is especially useful if there are custom holograms used for laminating the card. This is advantageous because it provides an additional level of security when used in sensitive installations such as military installations or printing driver licenses. The ID tag will further permit determining whether or not a ribbon can be used with any particular printer. The card 76 further can be used in connection with the ID tag 15 so that only a set number of prints can be issued by a single card 76, which information is presently used on many cards, limiting the uses to such set number. Other features can include information from a printer programmed into the ID tag 15 which indicates the type of printer used last. This information could be erased and reentered when the print ribbon is again used. The ID tag 15 is preferably RF programmable and readable.

When coordinated with the information about the individual frames received from the infrared sensor 56, identification, positioning, and operations of the ribbon can be completely controlled by the printer.

Figure 5:
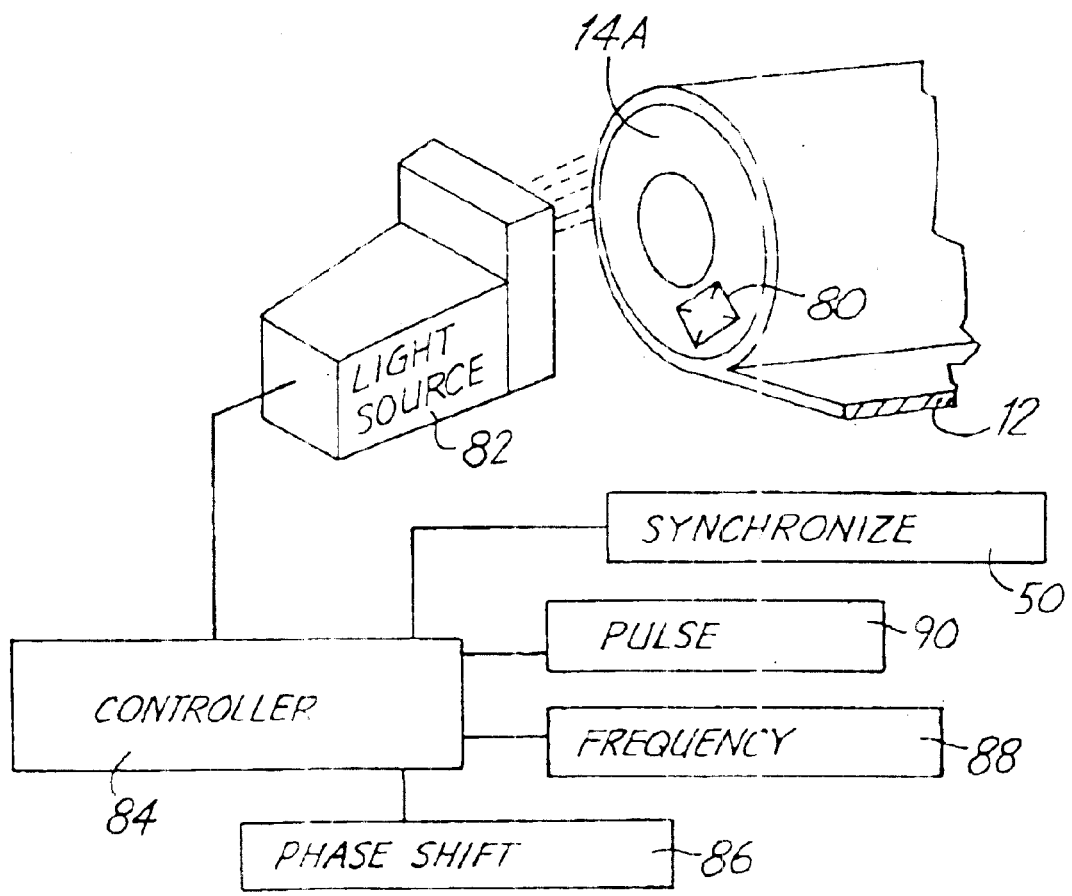
FIG. 5 is a fragmentary schematic perspective view of an embodiment that uses light signals for providing and receiving information.

A further modified form of the invention is illustrated in FIG. 5, where a core 14A is provided with a light sensitive circuit ID tag 80 that has light sensitive circuit elements that are in line to receive light or radiant energy from a light signal source circuit or signal circuit head 82, that transmits light with sufficient intensity to provide a signal to change a state in the tag 80 to record information. The light transmitted can be in the infrared range or in the visible light range. The light signal source also can receive signals from the ID tag 80 if the tag 80 is powered to provide light. A controller 84 controls the source or head 82 and can provide phase shift inputs from source 86, control of frequency from source 88, pulsing codes from source 90 and it can control intensity.

Figure 6:
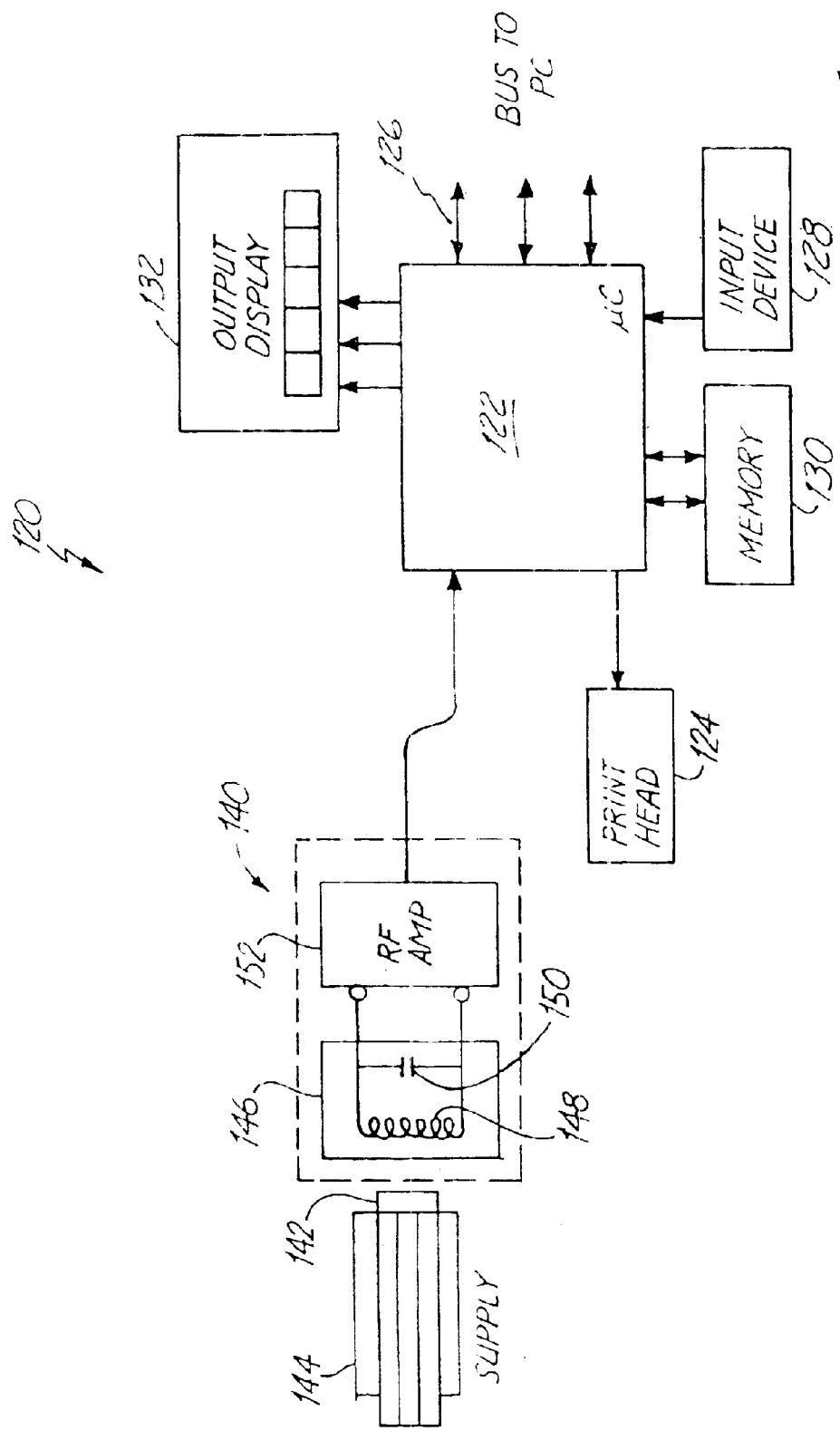
FIG. 6 is a simplified block diagram showing a printer in accordance with the present invention.

FIG. 6 is a simplified block diagram of an electronic printer 120 which illustrates more general aspects of the present invention. Printer 120 includes a controller or microprocessor 122 which is used to control print head 124 based upon data received through bus 126 which couples to a PC or other remote unit (not shown). Microprocessor 122 can received data through input device 128 and can store data in memory 130. Output information is provided through output display 132. Printer 120 also includes a transceiver 140 in accordance with the present invention for use in coupling to a radio frequency identification (RFID) tag 142 carried on supply 144. Transceiver 140 is configured to transfer power through a non-physical link to a radio frequency circuit carried in RFID tag 142. This causes RFID tag to responsively transmit data over a non-physical link to transceiver 140. Transceiver 140 includes an antenna 146 having a coil 148 and a capacitor 150. Antenna 146 couples to a radio frequency amplifier 152 which receives supply data from tag 142 and provides the supply data to controller 122.

Supply 144 can be any type of supply which is used with electronic printer 120. For example, supply 144 can comprise ribbon, intermediate transfer film, hologram material, toner, cleaning tape or ink such as for use with an ink jet or other type of printer. The RFID tag 142 can be any such RFID tag such as those which can be purchased commercially. One type of RFID tag is available from TEMIC Semiconductors a divisionb of ATMEL located in San Jose, Calif. For example, the TEMIC Model No. TK5550 is one such RFID tag.

Figure 7:
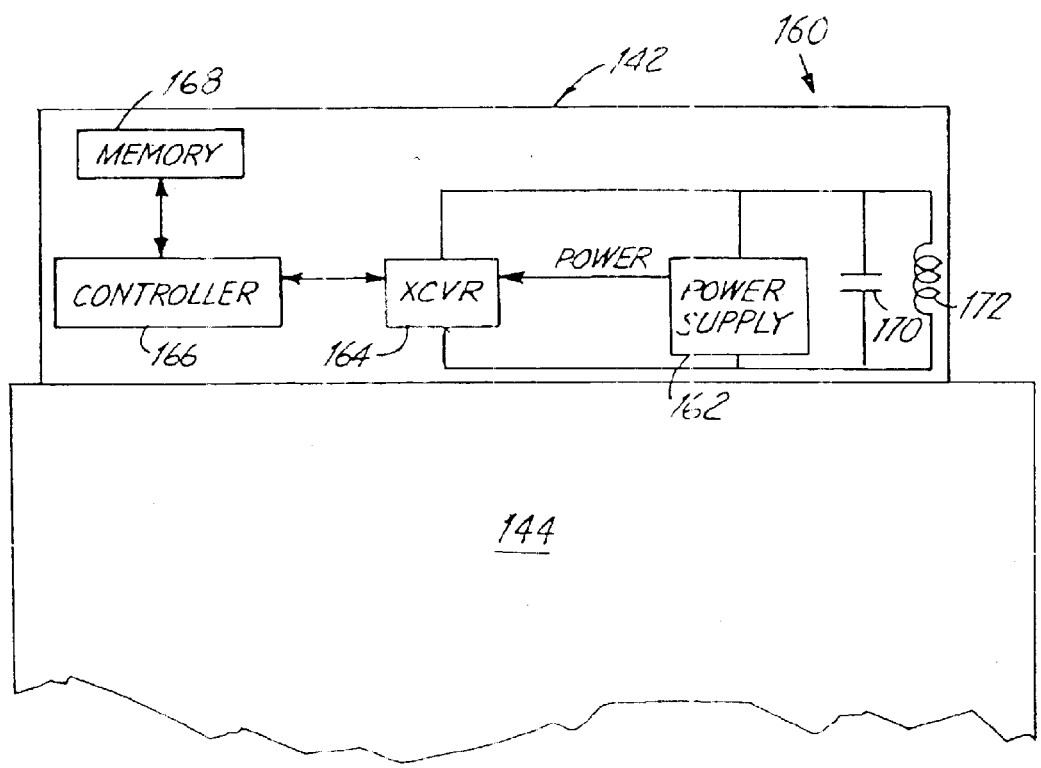
FIG. 7 is a simplified block diagram showing a printer supply including a radio frequency identification tag in accordance with the present invention.

FIG. 7 is a simplified block diagram showing RFID tag 142 coupled to printer supply 144. RFID tag 142 includes an antenna 160 formed by an electrical coil which couples to a power supply 162 and transceiver circuitry 164. A controller 166 couples to memory 168 and to transceiver circuitry 164. A tuning capacitor 170 is also provided in series with the coil 172. In operation, coil 148 of transceiver 140 is powered by RF amplifier 142 such that an inductive coupling occurs with coil 172 of RFID tag 142 when the two are in close proximity. However, in another embodiment a sufficiently strong signal or sufficiently sensitive circuitry are used whereby the tag 142 can be spaced a distance from coil 172. In one embodiment a 125 KHz signal is used to drive coil 148 which then inductively couples to coil 172.

Power supply 162 generates a stable power output used to power all of the circuitry within RFID tag 142 received through this inductive coupling. By modulating the signal, data can be transferred between transceiver 140 and RFID tag 142. Data from RFID tag transceiver 164 is provided to a controller 166. Controller 166 can record information or read information from memory 168. This configuration allows bi-directional communication between the RFID tag 142 and transceiver 140. In another embodiment, an internal power source such as a battery is used to power tag 142. In another embodiment, a physical connection to the printer or laminator is used to power tag 142.

Printer supply 144 can be any type of supply which is used by printer 120 in the printing process. For example, if printer supply 144 is a ribbon which could be carried on a spool or in a cartridge, various data can be stored in memory 168. This data includes the make and supplier of the ribbon such that operation of print head 124 can be optimized (i.e., the proper thermal printer head voltage can be optimized for a given dye carried on the ribbon). Further, a date code can be stored in memory to monitor the aging of the ribbon or other material. A lot code and material code can be stored in memory 168 for use in optimizing printing. Information regarding the ribbon panel or ink jet ink quantity can be stored in memory 168 and updated during use of the ribbon or ink such that the total quantity of remaining ribbons or ink can be read by printer 120 and stored in the supply tag. Additionally, information regarding ribbon quantity can be used when adjusting web tension of the ribbon as it moves between a supply spool and a take-up spool or in the case of ink jet, adjust the motor control for the amount of ink weight. Ribbon panel size information can be stored in memory 168 and used to provide diagnostics if the ribbon panel size does not match the size of the substrate. A part number stored in memory 168 can be used for diagnostics and for reordering additional supplies.

If supply 144 is an intermediate transfer film, supplier, date code information, lot code and material code information can be stored in memory 168 as can film panel quantity information, film panel size and part number. Film thickness information stored in memory 168 can be used to adjust the print head or laminator for the correct heat transfer level and use in controlling web tension.

If supply 144 is hologram or an OVD (Optical Variable Device) supplier, date code, lot code and material information, film quantity, film panel size, material thickness and/or part number information can be stored in memory 168 as described above. Additionally, a private key for digital encryption can be stored in memory 168 and used as a security key to prevent unauthorized use of the material. For example, printer 120 will not be able to print unless the correct security key is received from the PC through bus 126 which is used to unlock the material using the private key stored in memory 168.

If supply 144 is an ink jet ink supply or toner supply, supplier, date code, lot code and material information, ink/toner supply quantity and part number information can be stored in memory 168. Supply 144 can also comprise a laminate material for a laminator and memory 168 can store information such as lot code and material information, date code, supplier, material thickness, size, quantity, lamination and characteristics in heating requirements or other information. Similarly, if supply 144 is a cleaning web for cleaning rollers in a printer or laminator, similar information can be stored in memory 168. Additionally, memory 168 can contain the number of times the cleaning supply has been used such that an indication can be provided that the supply should be replaced.

If supply 144 comprises a substrate or print media, such as an identification card, memory 168 can be used to store information relating to the card size, thickness and substrate materials so that printing or lamination can be optimized for these materials. Additionally, memory 168 can be used to store coded security information for an identification card. For example, a security code stored in memory 168 can read by other devices such as a security door and used to gain access to a secure location by using the identification card. This data can also be used to interlock with smart chip information carried on the identification card or other information printed onto the card.

Figure 8:
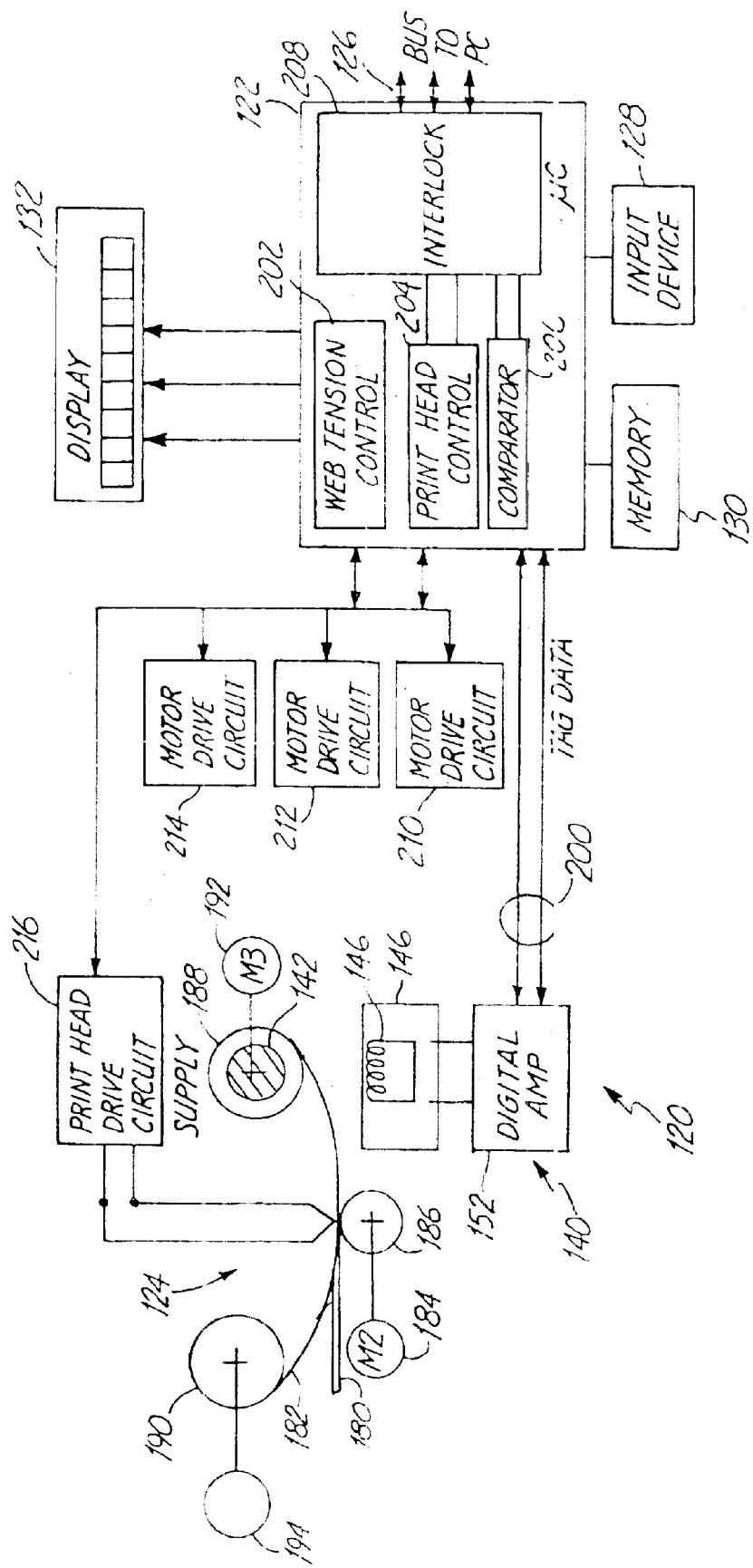
FIG. 8 is a more detailed block diagram of the printer of FIG. 6 and also illustrates an embodiment with a laminator.

FIG. 8 is a block diagram of printer 120 in greater detail. Printer 120 is shown receiving card 180 which passes proximate ribbon 182 and print head 124. A motor 184 drives a platen 186 while ribbon 182 moves between supply reel 188 and take-up reel 190 under the control of motor 192 and 194, respectively. Microprocessor 122 receives RFID tag data over bus 200 and includes web tension control 202, print head control 204, comparator 206 and interlock 208. Microprocessor 122 controls motors 194, 184 and 192 using motor drive circuits 210, 212 and 214, respectively while controlling print head 122 using print head drive circuitry 216. In various aspects of the invention, microprocessor controls web tension, print head heating and card movement based upon data received from an RFID tag 142 carried in supply spool 188. Comparator 206 is used to prevent printing through interlock 208 if date information carried in RFID tag 142 indicates that the ribbon has degraded due to age. Alternatively, this information can be displayed in display 132 and the operator can make a decision whether to use the material.

FIG. 8 also illustrates an embodiment in which an RFID tag 142 is used in a laminator. In such an embodiment, element 124 comprises a heated roller or other heating device and is controlled by a laminator drive circuit. Temperature feedback can also be provided from the laminator. In such an embodiment, the memory 168 in the RFID tag 142 can contain information regarding parameters which effect lamination temperature. Such information includes, for example, lamination film type, lamination film supplier, thickness, width, age such as through a date code or other such information.

In yet another aspect of the present invention, the information is transferred from the supply to the printer (or from the printer to the supply) over a physical connection such as through electrical wiring. In such an embodiment, the supply include electrical contacts to which the printer makes electrical contact when the supply is coupled to the printer. In such an embodiment, the power for the tag can be provided over the electrical connection. In another embodiment, a single pair of electrical connections are provided which carry both power and data between the supply and the printer. Referring to FIGS. 6 and 7, in such an embodiment the output from controller 166 can be optionally sent through a transceiver 164 and through a direct connection to microprocessor 122 in the printer/laminator. The transmission can be in any suitable format, for example, a binary format or a modulated signal such as an RF signal. Another non-contact method is to use a magnetic field to transmit information. This can be accomplished by using a magnetic head instead of an RF antenna. In another example of a non-physical link, an optical connection is provided between the supply and the printer or laminator.

FIG. 9 is an example memory map for memory 168 in the RFID tag 142. In the example of FIG. 9, the memory includes eight blocks (block 0 through Block 7) each having 32 bits (address of 0–31). The example of FIG. 9 is for a ribbon and contains information such as the number of images printed, the material, the supplier, the panel size, the ribbon thickness, the lot code number, the expiration date month and the expiration date year, and identification number of the roll, an interlock used to lock the supply and prevent use of incorrect supplies with the printer or laminator, a second customizable locking feature which can be used, for example, for security, an error code, a customer name, an operator ID, user date or password information. Note that these are merely provided as one example and the present invention can implement any appropriate memory configuration.

Although the present invention has been described with reference to preferred embodiments, workers skilled in the art will recognize that changes may be made in form and detail without departing from the spirit and scope of the invention.

What is claimed is:

1. An identification card printer or laminator system for printing on or laminating a card, the system comprising:
   a card transport mechanism configured to transport a card along a path;
   a print or lamination mechanism configured to print or laminate the card;
   a print or lamination consumable supply including a tag circuit containing supply data including a tag security code; and
   a controller configured for communication with the tag circuit, the controller configured to allow operation of the printer or laminator system with the consumable supply when the tag security code is valid, and to prevent operation of the printer or laminator system with the consumable supply when the tag security code is invalid.

2. The system of claim 1, wherein the controller is further configured to compare the tag security code to a second security code to determine whether the tag security code is valid or invalid.

3. The system of claim 2, wherein the second security code is contained in memory that is accessible by the controller and is detached from the print or lamination consumable supply.

4. The system of claim 2, wherein the controller is configured to read memory of a key card containing the second security code.

5. The system of claim 1, including a communication link between the controller and the tag circuit.

6. The system of claim 5, wherein the communication link is a physical link.

7. The system of claim 5, wherein the communication link is a wireless communication link.

8. The system of claim 5, wherein the communication link is bi-directional.

9. The system of claim 5, wherein the communication link includes a transceiver.

10. The system of claim 9, wherein the transceiver includes an antenna.

11. The system of claim 9, wherein the antenna is configured to provide power to the tag circuit.

12. The system of claim 9, wherein the transceiver is configured to send data to the tag circuit of the consumable supply.

13. The system of claim 12, wherein the data sent to the tagged circuit of the supply relates to incremental usage of the supply.

14. The system of claim 9, wherein the communication link includes an optical link.

15. The system of claim 1, wherein the supply data includes a physical dimension of the supply.

16. The system of claim 1, wherein the supply data includes printer or laminator settings for the supply.

17. The system of claim 1, wherein the supply data includes a make of the supply.

18. The system of claim 1, wherein the supply data includes a supplier of the supply.

19. The system of claim 1, wherein the supply data includes a date code.

20. The system of claim 1, wherein the supply data includes a lot code.

21. The system of claim 1, wherein the supply data includes a quantity of supply remaining.

22. The system of claim 1, wherein the supply data includes a supply interlock.

23. The system of claim 1, wherein the consumable supply comprises a ribbon.

24. The system of claim 1, wherein the consumable supply comprises an ink cartridge for an ink jet printhead.

25. The system of claim 1, wherein the consumable supply comprises lamination material.

26. The system of claim 1, wherein the consumable supply comprises an intermediate transfer film.

27. The system of claim 1, wherein the consumable supply comprises hologram film material.

28. The system of claim 1, wherein the consumable supply comprises cleaning tape.

29. A method of controlling an identification card printer or laminator comprising:
   a) providing a print or lamination consumable supply including a tag circuit containing supply data including a tag security code;
   b) reading the tag security code;
   c) comparing the tag security code to a corresponding second security code to determine whether the tag security code is valid or invalid; and
   d) disabling operation of the printer or laminator when the tag security code is invalid.

30. The method of claim 29, wherein the comparing step c) includes reading the second security code from a memory that is detached from the print or lamination consumable supply.

31. The method of claim 30, wherein the memory is contained on a key card.

32. The method of claim 29, wherein the reading step b) includes wirelessly transmitting the tag security code.

33. The method of claim 29, wherein the consumable supply comprises a ribbon.

34. The system of claim 29, wherein the consumable supply comprises an ink cartridge for an ink jet printhead.

35. The system of claim 29, wherein the consumable supply comprises lamination material.

36. The system of claim 29, wherein the consumable supply comprises an intermediate transfer film.

37. The system of claim 29, wherein the comsumable supply comprises hologram film material.

38. The system of claim 29, wherein the consumable supply comprises cleaning tape.

* * * * *